3,021,216
ANIMAL FEED COMPOSITIONS
Walter Rosenthal, 740 West End Ave., New York 17, N.Y., and Gerald Schorsch, 494 Hunts Point Ave., New York 59, N.Y.
No Drawing. Filed July 21, 1960, Ser. No. 44,263
14 Claims. (Cl. 99—2)

The present invention relates to animal feed compositions and more particularly to compositions containing conventional animal feed mash or nutrient material with which has been combined at least one chemical additive which is a derivative of 8-hydroxyquinoline.

Farm animals and particularly cattle and cows, which feed extensively on grass and hay, are subject to certain digestive upsets and disorders due to bacterial overgrowth, especially of the paratyphoid, coli, salmonella and aerobacter groups of intestinal bacteria, diarrhea and excessive gas formation. Bacteria overgrowth is equivalent to a low degree intestinal infection which is capable of destroying valuable nutrients and impeding proper digestion and assimilation of food and consequently of interfering with absorption through the intestinal wall with resulting waste of nutrients. The treatment previously used has been the admixture of crude antibiotics in the form of fermentation residues from the manufacture of various yeast and mold derivatives. However, it is now more customary for cattle, cows, sheep, hogs and poultry and other livestock to be fed a mash comprising various nutrient materials, the nature of which is, per se, well known, and which may contain, for example, corn and soya bean meal. This mash does not overcome the digestive disturbances above noted, even though it does have a superior nutritional value. Animals feeding on mash still have the aforementioned and other digestive disturbances.

It has now been found that by combining with feed or mash one of the 8-hydroxyquinoline derivatives hereinafter specified, or mixtures of two or more of such derivatives in any desired relative proportions, the animals are rendered free or substantially free from the disadvantages set forth above, thus promoting their health and growth as well as weight increase and milk production and better feed efficiency. The products of this invention have been found to be far superior in many respects to the use of antibiotics in feed. Bioassays are eliminated, storage deterioration is obviated and preservation of the feeds is aided. Economics are also effected and there is an unlimited supply at all times. It is, however, a part of this invention to incorporate, as an additional additive, an antibiotic, such as aureomycin, into the feeds even though the action of such in assisting weight gain is not fully understood. Vitamins and minerals can also optionally be added to the feeds. None of these additives detracts from the effectiveness of the products of the invention.

The 8-hydroxyquinoline derivative is added to and thoroughly mixed with the mash or other conventional nutrient feed in such proportions that when the animals ingest their normal daily ration they at the same time ingest from about 10 mg. to 10 grams per day per 1,000 pounds of body weight of the 8-hydroxyquinoline derivative. Animal feed with which such a compound or derivative has been combined and intimately admixed has been found to reduce markedly the overgrowth of bacteria and to greatly reduce gas formation and stool movements and to provide the other advantages mentioned above.

The 8-hydroxyquinoline derivative which can be used according to the present invention may be defined as 8-hydroxyquinoline compounds substituted in the 7-position by a halogen atom and in the 5-position by either a halogen atom or the sulfonic acid radical as well as non-toxic salts of sulfonic acid. The 8-hydroxyquinoline derivative may optionally have an alkyl substituent in the 2-position, for example, a 2-methyl substituent, in which case the derivative is a quinaldine instead of a quinoline. Thus, the additive can be defined as a mono- or di-halogenated 8-hydroxyquinoline or 8-hydroxyquinaldine and when there is a halogen substituent in only the 7-position, the 5-position may be substituted by sulfonic acid or a non-toxic water-soluble or water-insoluble salt thereof. Typical and illustrative derivatives are represented by the following non-limitative tabulation:

5-chloro-7-iodo-8-hydroxyquinoline
5-chloro-7-bromo-8-hydroxyquinoline
5,7-dichloro-8-hydroxyquinaldine
5,7-dibromo-8-hydroxyquinoline
7-iodo-8-hydroxyquinaldine
7-iodo-8-hydroxyquinoline-5-sulfonic acid
7-iodo-8-hydroxyquinoline-5-sulfonic acid sodium salt
7-iodo-8-hydroxyquinoline-4-sulfonic acid calcium salt
7-iodo-8-hydroxyquinoline-5-sulfonic acid copper salt The salts may be either water-soluble salts or water-insoluble salts, the latter being preferred, however, since their property of water-insolubility is an advantage in that the additive does not leach out of the feed. The water-soluble salts are advantageous where it is desired, for example, to add the same to the drinking water of the animal. In general, we have found that the salts may be alkali salts such as the sodium salt, alkaline earth metal salts such as the calcium salt, or a salt of a heavy but non-toxic metal such as copper, magnesium or aluminum.

The amount of feed consumed by an animal depends upon various recognized factors, such as the species of animal, its age and rate of growth and the state of its health. In feeding animals mash or other nutrient materials, the practice is to place before the animals an amount of feed which is at least equal to and usually exceeds the normal daily ratio of that animal or group of animals. The animals are allowed to feed thereupon ad lib; in other words, to eat when they are so disposed and as much as they desire.

The present invention comprises the combination with the above mentioned 8-hydroxyquinoline derivative or a mixture thereof in such amount that each animal will ingest from 10 mg. to 10 grams of the derivative per day per 1,000 pounds of body weight. It will be appreciated that no general rule can be laid down for the amount of mash or nutritive material consumed or ingested per day, but this is itself well known and depends upon the factors above set forth. With that information and knowledge, it is easy to incorporate the necessary amount of additive to provide the 10 mg. to 10 grams per day of chemical supplement. The particular amount to be supplied within the 10 mg. to 10 grams range can be readily adjusted so that when the desired results are obtained, the amount can be stabilized at that figure. Usually the amount of additive will be in the lower part of the range in the beginning and may be increased if necessary. The additive is completely tasteless, non-toxic and harmless to the animal and does not adversely affect the animal or its flesh or milk in any way, even if administered the day before slaughtering.

The compositions responding to the invention have been found to be very beneficial when used in accordance with the foregoing recommendations and animals ingesting such compositions have been found to be relieved of flatulence and diarrhea and the undue growth of bacteria as well as providing the other advantages referred to above, such as increased weight gain. The water-insoluble salts or derivatives have the additional advantage that they are retained in the intestines for a longer period of time than the water-soluble salts or derivatives and thus exert their beneficial action over an increased period of time.

The invention comprises not only the feed compositions above described, but also a premix or concentrate wherein the 8-hydroxyquinoline derivative is mixed with a relatively small proportion of a nutritive or non-nutritive carrier or vehicle. Preferably, the carrier is nutritive, proteinaceous material, but may be bulk material or inert material. This premix or concentrate is then added to or combined with the mash or other nutritive material prior to seting the same out for the animals to feed upon. Alternatively, and where a water-soluble salt is used, the same may be added to the drinking water of the animal in which it dissolves. While such water-soluble salt does not impart any unduly disagreeable taste to the water such as would cause the animals to refrain from drinking the normal amount of water, we can, optionally, add any suitable taste-masking substance, although this is not ordinarily necessary.

The 8-hydroxyquinoline derivatives may be conveniently represented by the following structural formula:

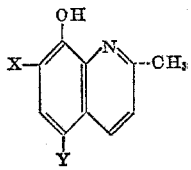

wherein X is a halogen such as chlorine, bromine or iodine, and Y is either a halogen which may be the same as or different from the halogen X or the sulfonic acid radical $SO_3H$ or a water-soluble or water-insoluble salt thereof. The broken bond line leading to the methyl group in the 2-position is so shown to indicate that it is optional and may either be present or absent. When it is absent, the derivative is an 8-hydroxyquinoline and when it is present the derivative is an 8-hydroxquinaldine.

This application is a continuation-in-part of our application Serial No. 699,210, filed November 27, 1957 now abandoned.

We claim:

1. A composition for oral ingestion by livestock comprising nutrient feed material with which is combined, as an additive, a member of the group consisting of an 8-hydroxyquinoline compound substituted in the 7-position by a halogen atom and in the 5-position by a member of the group consisting of a halogen atom, the sulfonic acid radical and non-toxic salts of sulfonic acid, and the corresponding 8-hydroxyquinaldines, the amount of additive being sufficient to provide 10 mg. to 10 grams per day per 1,000 pounds of body weight when the animal ingests its normal daily ration of the nutrient feed material, and the amount of said substituted 8-hydroxyquinaldine compound being sufficient to enhance nutrition of the livestock and to create in their intestines optimum conditions for nutrition substantially free from bacterial overgrowth.

2. The composition of claim 1, in which the additive is 5-chloro-7-iodo-8-hydroxyquinoline.

3. The composition of claim 1, in which the additive is 5-chloro-7-bromo-8-hydroxyquinoline.

4. The composition of claim 1, in which the additive is 5,7-dichloro-8-hydroxyquinaldine.

5. The composition of claim 1, in which the additive is 7-iodo-8-hydroxyquinoline-5-sulfonic acid.

6. The composition of claim 1, in which the additive is a non-toxic salt of 7-iodo-8-hydroxyquinoline-5-sulfonic acid.

7. The composition of claim 6, in which the salt is a water-insoluble salt.

8. The composition of claim 6, in which the salt is a water-soluble salt.

9. A concentrate for combination with animal feed which comprises carrier material containing an 8-hydroxyquinoline derivative defined by claim 1.

10. The concentrate of claim 9, in which the carrier material is nutritive.

11. The composition of claim 1, in which a mixture of the specified additives is combined with the nutrient feed material.

12. The composition of claim 1, in which an antibiotic has been incorporated.

13. The composition of claim 1, in which vitamins and minerals have been incorporated.

14. The composition of claim 1, in which an antibiotic, vitamins and minerals have been incorporated.

References Cited in the file of this patent
UNITED STATES PATENTS 2,758,997   Steck _____ Aug. 14, 1956
2,831,795   Hymas _____ Apr. 22, 1958

OTHER REFERENCES

Hutyra et al.: Pathology and Therapeutics of Disease of Domestic Animals, vol. II, 1938, Alexander Eger, Chicago, page 362.

De Volt: Poultry Science, November 1950, pp. 924–6, vol. 26, No. 6.

Merck Index, 6th Edition, 1952, page 530.